Patented Feb. 13, 1923.

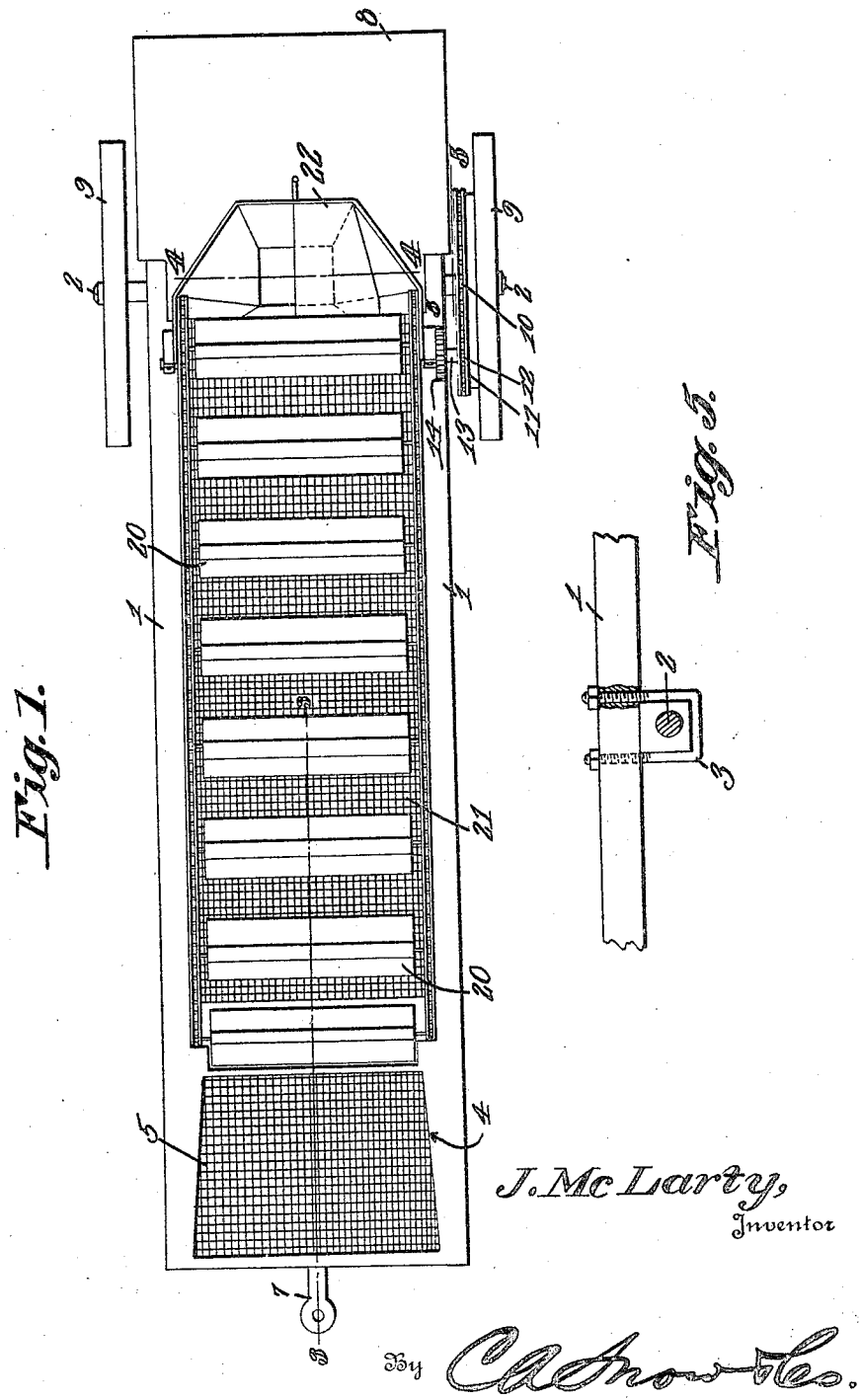

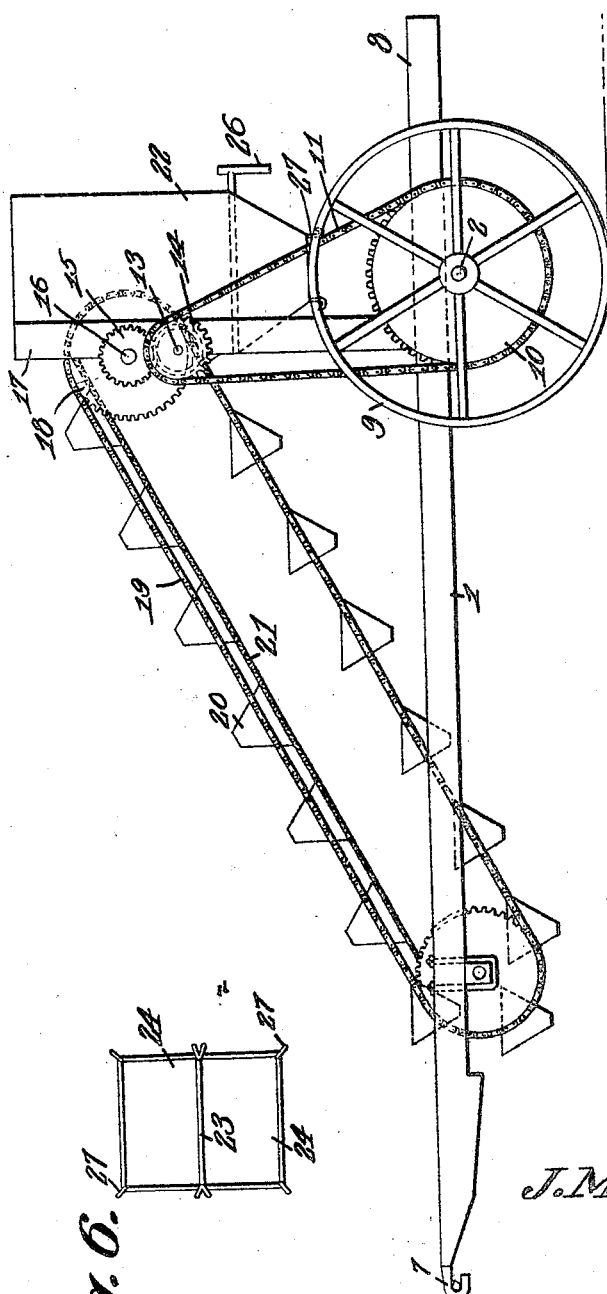

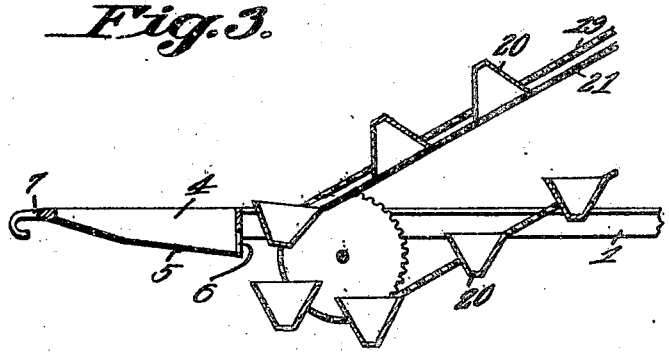
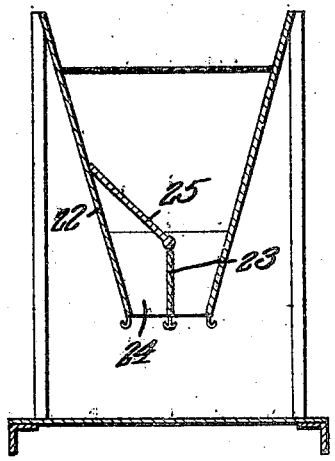

1,445,336

UNITED STATES PATENT OFFICE.

JOHN McLARTY, OF SAULT STE. MARIE, ONTARIO, CANADA.

APPARATUS FOR CLEANING AND HARVESTING POTATOES.

Application filed September 22, 1922. Serial No. 591,323.

*To all whom it may concern:*

Be it known that I, JOHN McLARTY, a subject of the King of England, residing at Sault Ste. Marie, in the Province of Ontario and Dominion of Canada, have invented a new and useful Apparatus for Cleaning and Harvesting Potatoes, of which the following is a specification.

This invention relates to apparatus for cleaning and harvesting potatoes. It is designed primarily for use in connection with a potato digger, said digger being adapted to deliver the potatoes to the apparatus constituting the present invention.

A further object is to provide apparatus of this character which will collect the potatoes in buckets and drag them over a screen whereby the potatoes will be thoroughly agitated and the dirt separated therefrom.

A further object is to provide a machine of this character which will deliver the potatoes after being cleaned, into a hopper having a deflecting gate whereby the potatoes will be delivered to either of two outlets thus to enable bags to be filled readily.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a plan view of the machine.

Figure 2 is a side elevation thereof.

Figure 3 is a section on line 3—3, Figure 1.

Figure 4 is a section on line 4—4, Figure 1.

Figure 5 is a section on line 5—5, Figure 1.

Figure 6 is a bottom plan view of the delivery hopper.

Referring to the figures by characters of reference 1 designates a suitable frame the rear end portion of which is mounted on an axle 2 and secured thereto by means of U-bolts 3 or the like. The forward portion of the frame has a receiver 4 provided with a screen bottom 5 and with a rear outlet 6, the screen bottom being inclined downwardly toward the outlet.

A clevis 7 of any suitable construction is provided at the front end of the frame for connecting it to the rear portion of a potato digging apparatus, not shown.

The rear portion of the frame 1 is provided with a platform 8.

The axle 2 is supported by wheels 9 one of which has a sprocket 10 for driving a chain 11. This chain is adapted to transmit motion through a sprocket 12 secured to a transverse shaft 13 on which is fastened a gear 14. This gear meshes with another gear 15 secured to a transverse shaft 16 journaled on an upstanding frame 17. Sprockets 18 are secured to the shaft 16 and support endless chains 19. Hung between these chains are parallel buckets 20 adapted to be brought successively to position under the outlet 6 so as to receive the potatoes delivered therethrough.

An inclined screen 21 is mounted under the upper flights of the chains 19, this screen extending upwardly to a point above the shaft 16 and being adapted to deliver articles into a hopper 22 supported above the platform 8. The lower portion of the hopper is divided by a vertical partition 23 into separate outlets 24 and a gate 25 is pivotally mounted above the partition so as to close off either outlet, this gate when in shut position, being inclined as shown in Figure 4. The gate can be actuated in any suitable manner, as by means of a lever 26 extending beyond the wall of the hopper. Hooks 27 or the like are located at the corners of each outlet for engagement with sacks so as to support them in position to receive the potatoes delivered from the hopper.

When the machine is drawn along after a potato digging apparatus the potatoes will be delivered into the receiver 4 and will gravitate along the screen 5 to the outlet 6 and thence into the buckets as they are brought successively to position under the outlet.

As the buckets move upwardly past the outlet they strike against the lower end of the screen 21 and are caused to rotate about their pivotal connections with the chains so as to assume inverted positions on the screen, the potatoes resting on the screen and being dragged therealong by the inverted buckets. Thus the dirt carried by the potatoes will be separated therefrom and will drop through the coarse screen 21 leaving the potatoes comparatively clean when they reach the upper portion of the screen. The potatoes will here drop into the hopper and will be deflected to one outlet 24 or the other, according to the position of the gate 25. Thus while a sack is being supported under one of the outlets 24 and potatoes are being directed thereinto, another sack can be placed below the other outlet so that as soon as the first sack has been filled the gate can be shifted and potatoes directed into the other sack.

What is claimed is:—

1. A machine for cleaning and bagging potatoes and the like, comprising a movably supported frame, a screen movable therewith and extending upwardly therebeyond, an endless series of elevating buckets, and means operated by the forward movement of the machine for actuating the buckets to bring them successively into position to receive material from the first named screen and to elevate the loaded buckets onto the upper screen, said buckets successively cooperating with the upper screen to invert the bucket and deposit the contents thereof on the screen and under the bucket.

2. The combination with a movably supported structure including a screen for receiving articles to be cleaned and bagged, and an upper inclined screen, of an endless series of buckets movable above and below the inclined screen, means operated by the movement of the structure for moving the buckets successively into position to receive material from the first named screen and to elevate the buckets onto the inclined screen, each bucket cooperating with one end of the screen to invert the bucket and deposit the contents thereof on the inclined screen and under the inverted bucket, said inverted bucket constituting means for dragging the material along the inclined screen.

3. The combination with a movably supported structure including a screen for receiving articles to be cleaned and bagged, and an upper inclined screen, of an endless series of buckets movable above and below the inclined screen, means operated by the movement of the structure for moving the buckets successively into position to receive material from the first named screen and to elevate the buckets onto the inclined screen, each bucket cooperating with one end of the screen to invert the bucket and deposit the contents thereof on the inclined screen and under the inverted bucket, said inverted bucket constituting means for dragging the material along the inclined screen, a hopper for receiving the material from the inclined screen when delivered from the upper end thereof.

4. The combination with a movably supported structure including a screen for receiving articles to be cleaned and bagged, and an upper inclined screen, of an endless series of buckets movable above and below the inclined screen, means operated by the movement of the structure for moving the buckets successively into position to receive material from the first named screen and to elevate the buckets onto the inclined screen, each bucket cooperating with one end of the screen to invert the bucket and deposit the contents thereof on the inclined screen and under the inverted bucket, said inverted bucket constituting means for dragging the material along the inclined screen, a hopper for receiving the material from the inclined screen when delivered from the upper end thereof, and means in the hopper for deflecting the contents thereof toward either of a pair of bags supported from the hopper.

5. In a device of the class described the combination with an inclined screen, of an endless series of buckets movable above and below the screen, and means for actuating the buckets to direct them successively into position above the screen, there being cooperating means lying between the bucket and screen for inverting the bucket above the screen and depositing its contents on the screen and under the bucket to be dragged longitudinally of the screen by the bucket.

6. The combination with a screen, of a conveying container and means for actuating the container to direct it to and along the screen, said container and screen cooperating to invert the container and deposit the contents thereof on the screen and under the container.

7. The combination with a screen, and a movably supported container, of means for moving the container into contact with and dragging it along the screen, said screen and container cooperating to invert the container and deposit the contents thereof on the screen and under the container.

8. The combination with a screen, of an endless series of containers, and means for actuating the containers to bring them against and move them over and in contact with the screen, said containers successively cooperating with the screen to invert the containers and deposit the contents thereof on the screen.

9. The combination with a screen, of containers for conveying material to the screen, means for inverting the containers to deposit the contents thereof on the screen and under the container and means for dragging the container along the screen.

In testimony that I claim the foregoing as my own, I have hereto affixed my signature in the presence of two witnesses.

JOHN McLARTY.

Witnesses:
JACK HARPER,
JAMES LELAND DARLING.